United States Patent
Liu et al.

(10) Patent No.: US 11,159,768 B1
(45) Date of Patent: Oct. 26, 2021

(54) USER GROUPS BASED ON ARTIFICIAL REALITY

(71) Applicant: Facebook Technologies, LLC, Menlo Park, CA (US)

(72) Inventors: Jim Sing Liu, Kirkland, WA (US); Olivier Marie Bouan Du Chef Du Bos, San Francisco, CA (US); Hermes Germi Pique Corchs, Menlo Park, CA (US); Matthew Roberts, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/239,509

(22) Filed: Jan. 3, 2019

(51) Int. Cl.
| | |
|---|---|
| *H04N 7/15* | (2006.01) |
| *H04W 4/029* | (2018.01) |
| *G06T 15/20* | (2011.01) |
| *H04L 29/06* | (2006.01) |
| *G06T 19/20* | (2011.01) |
| *G06T 19/00* | (2011.01) |

(52) U.S. Cl.
CPC ........... *H04N 7/157* (2013.01); *G06T 15/205* (2013.01); *G06T 19/003* (2013.01); *G06T 19/20* (2013.01); *H04L 67/38* (2013.01); *H04W 4/029* (2018.02)

(58) Field of Classification Search
USPC ....................................................... 348/14.08
See application file for complete search history.

(56) References Cited

U.S. PATENT DOCUMENTS

| | | | | |
|---|---|---|---|---|
| 9,384,469 | B2 * | 7/2016 | Alkov | A63F 13/79 |
| 2012/0054646 | A1 * | 3/2012 | Hoomani | A63F 13/87 |
| | | | | 715/758 |
| 2018/0005429 | A1 * | 1/2018 | Osman | G06T 15/20 |
| 2018/0102999 | A1 * | 4/2018 | Keysers | G06Q 50/01 |

FOREIGN PATENT DOCUMENTS

WO 2020/068878 A1 4/2020

OTHER PUBLICATIONS

International Search Report and Written Opinion received for PCT Application Serial No. PCT/US2019/068878 dated May 4, 2020, 14 pages.

* cited by examiner

*Primary Examiner* — Amal S Zenati
(74) *Attorney, Agent, or Firm* — FisherBroyles, LLP

(57) ABSTRACT

The disclosed computer-implemented method may include receiving a first input from a first artificial reality device detecting a first environment of a first user and determining a first environmental feature of the first environment based on the first input. The method may include receiving a second input from a second artificial reality device detecting a second environment of a second user and determining a second environmental feature of the second environment based on the second input. The method may include comparing the first environmental feature with the second environmental feature and including, based on the comparison, the first and second users in a group for online interactions. Various other methods, systems, and computer-readable media are also disclosed.

20 Claims, 7 Drawing Sheets

USER GROUPS BASED ON ARTIFICIAL REALITY

BACKGROUND

Network application platforms, such as social networks, may allow users to connect and interact in various ways. For example, on a social network, users may post content and allow other users to comment or reply to the posts. As another example, users may be engaged in a dialogue on a chat feature of the social network. These interactions linking users may provide a basis for defining user groups. Once defined, a member of the user group may then invite other members of the group to a particular activity, such as a video game that may be launched from the social network. Unfortunately, creating groups based on online interactions may be fairly limited and may not fully account for how users may interact and gather in the real world.

SUMMARY

Advancements in computing hardware have made artificial reality devices, such as augmented reality (AR) or virtual reality (VR) devices, more available to users. These artificial reality devices may be capable of sensing and analyzing a user's surrounding environment. With the additional data available when using artificial reality devices, additional factors beyond linking users through shared interactions on a network application platform may be used for defining user groups. As will be described in greater detail below, the instant disclosure describes defining user groups using artificial reality signals.

In one example, a computer-implemented method for defining user groups based on artificial reality may include (1) receiving a first input from a first artificial reality device detecting a first environment of a first user, (2) determining a first environmental feature of the first environment based on the first input, (3) receiving a second input from a second artificial reality device detecting a second environment of a second user, (4) determining a second environmental feature of the second environment based on the second input, (5) comparing the first environmental feature with the second environmental feature, and (6) including, based on the comparison, the first and second users in a group for online interactions.

In some examples, the first environmental feature may correspond to a first location of the first user, and the second environmental feature may correspond to a second location of the second user. The first input may comprise image data of the first user's vicinity at the first location and the second input may comprise image data of the second user's vicinity at the second location. Determining the first environmental feature may comprise identifying the first location based on the first input and determining the second environmental feature may comprise identifying the second location based on the second input.

In some examples, comparing the first environmental feature with the second environmental feature may comprise determining a distance between the first location and the second location and comparing the distance to a distance threshold. Including the first and second users in the group may be based on the distance satisfying the distance threshold.

In some examples, the first location may correspond to a first area and the second location may correspond to a second area. Comparing the first environmental feature with the second environmental feature may comprise comparing the first area with the second area and including the first and second users in the group may be based on the first area matching the second area. In some examples, the first area or the second area may correspond to an indoor environment.

In some examples, the first input may comprise image data of the first user's vicinity at the first location and the second input may comprise image data of the second user's vicinity at the second location. Determining the first environmental feature may comprise recognizing a first object from the first input and determining the second environmental feature may comprise recognizing a second object from the second input. Comparing the first environmental feature with the second environmental feature may comprise comparing the first object with the second object and including the first and second users in the group may be based on the first object matching the second object. In some examples, the first object or the second object may correspond to a virtual object. In some examples, the first environmental feature or the second environmental feature may correspond to a virtual location.

In some examples, determining the first environmental feature or the second environmental feature may be further based on at least one of a location signal, a GPS signal, or a WiFi signal.

In some examples, determining the first environmental feature may include identifying the first user and determining the second environmental feature may include identifying the second user. Defining the group may be further based on the first user being associated with the second user in a social network associated with the application. In some examples, identifying the first user or identifying the second user may be based on facial recognition.

In some examples, the above-described method may be encoded as computer-readable instructions on a computer-readable medium. For example, a computer-readable medium may include one or more computer-executable instructions that, when executed by at least one processor of a computing device, may cause the computing device to (1) receive a first input from a first artificial reality device detecting a first environment of a first user, (2) determine a first environmental feature of the first environment based on the first input, (3) receive a second input from a second artificial reality device detecting a second environment of a second user, (4) determine a second environmental feature of the second environment based on the second input, (5) compare the first environmental feature with the second environmental feature, and (6) include, based on the comparison, the first and second users in a group for online interactions.

In some examples, the first input may comprise image data of the first user's vicinity at a first location of the first user and the second input may comprise image data of the second user's vicinity at a second location of the second user. Determining the first environmental feature may comprise identifying the first location based on the first input and determining the second environmental feature may comprise identifying the second location based on the second input.

In some examples, the first location may correspond to a first area and the second location may correspond to a second area. Comparing the first environmental feature with the second environmental feature may comprise comparing the first area with the second area and including the first and second users in the group may be based on the first area matching the second area.

In some examples, the first input may comprise image data of the first user's vicinity at the first location and the second input may comprise image data of the second user's vicinity at the second location. Determining the first environmental feature may comprise recognizing a first object from the first input and determining the second environmental feature may comprise recognizing a second object from the second input. Comparing the first environmental feature with the second environmental feature may comprise comparing the first object with the second object and including the first and second users in the group may be based on the first object matching the second object.

In some examples, determining the first environmental feature may include identifying the first user, determining the second environmental feature may include identifying the second user, and defining the group may be further based on the first user being associated with the second user in a social network associated with the application. In some examples, the first environmental feature or the second environmental feature may correspond to a virtual location.

In addition, a corresponding system for defining user groups based on artificial reality may include one or more processors and a memory comprising instructions that when executed by the one or more processors may cause the system to (1) receive a first input from a first artificial reality device detecting a first environment of a first user, (2) determine a first environmental feature of the first environment based on the first input, (3) receive a second input from a second artificial reality device detecting a second environment of a second user, (4) determine a second environmental feature of the second environment based on the second input, (5) compare the first environmental feature with the second environmental feature, and (6) include, based on the comparison, the first and second users in a group for online interactions.

In some examples, the first input may comprise image data of the first user's vicinity at a first location of the first user and the second input may comprise image data of the second user's vicinity at a second location of the second user. Determining the first environmental feature may comprise identifying the first location based on the first input and determining the second environmental feature may comprise identifying the second location based on the second input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
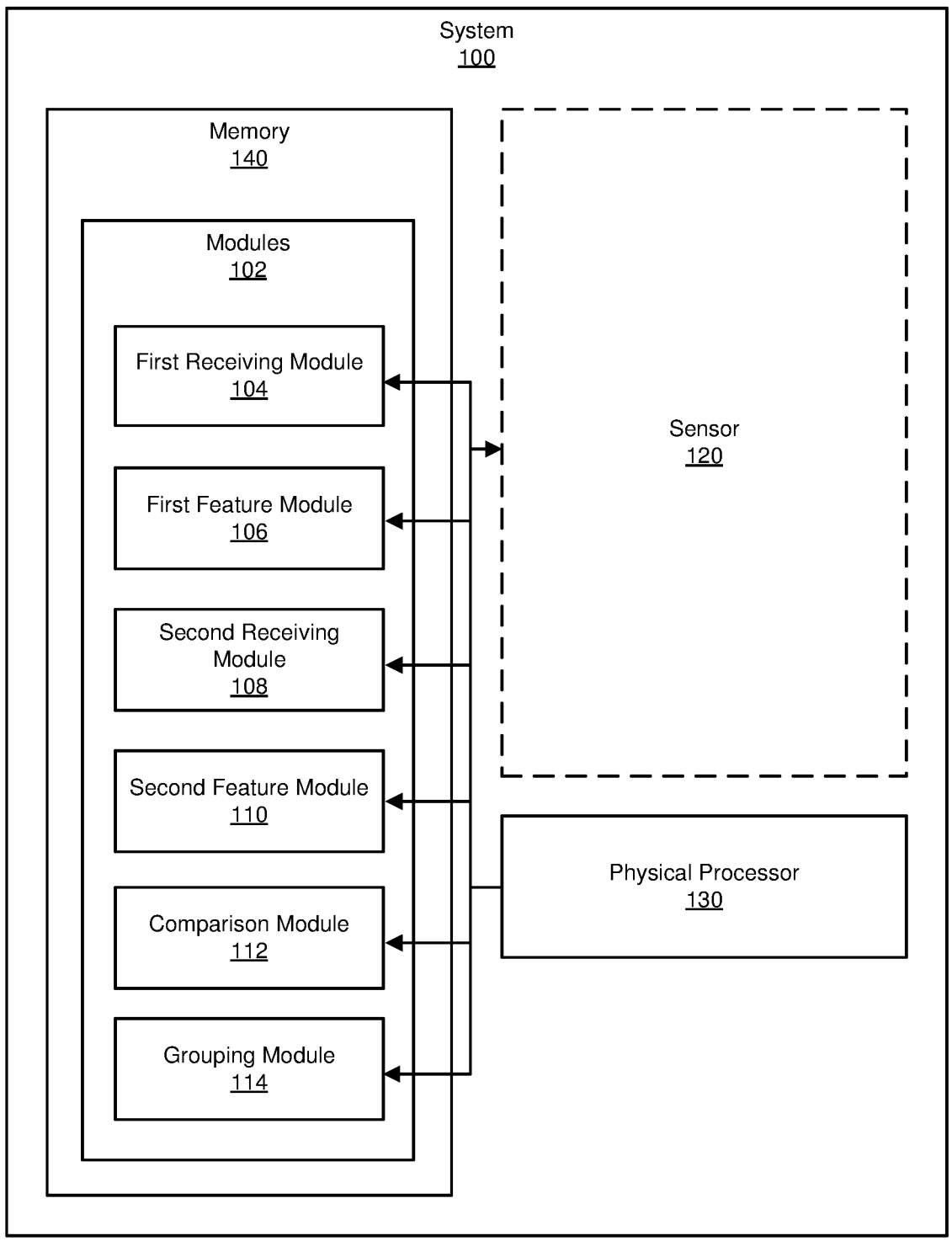
FIG. 1 is a block diagram of an exemplary system for defining user groups using artificial reality signals, according to aspects of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to defining user groups using artificial reality signals. As will be explained in greater detail below, embodiments of the instant disclosure may receive inputs from users' artificial reality devices and determine environmental features respective to each user. The environmental features may be compared to determine whether users' environments match. When the environments match, the corresponding users may be grouped together.

Embodiments of the present disclosure may provide a number of features and advantages over traditional systems that are not configured to leverage signals from artificial reality devices. Traditional systems may be limited in available signals for defining user groups. For instance, user groups may be defined based on linking users who have interacted on a network application platform. Artificial reality devices may provide additional signals to allow grouping users based on, for example, physical proximity.

Embodiments of the present disclosure may provide a method for defining user groups based on artificial reality device inputs. Additionally, embodiments of the present disclosure may improve the functioning of a computer by incorporating a more sophisticated method of defining user groups without significantly increasing processing requirements beyond what is required for artificial reality experiences. Moreover, the embodiments of the instant disclosure may improve the field of artificial reality, for example, by providing an intuitive way to group artificial reality users using available signals. These and other features and advantages may be enabled by the embodiments discussed herein.

Figure 2:
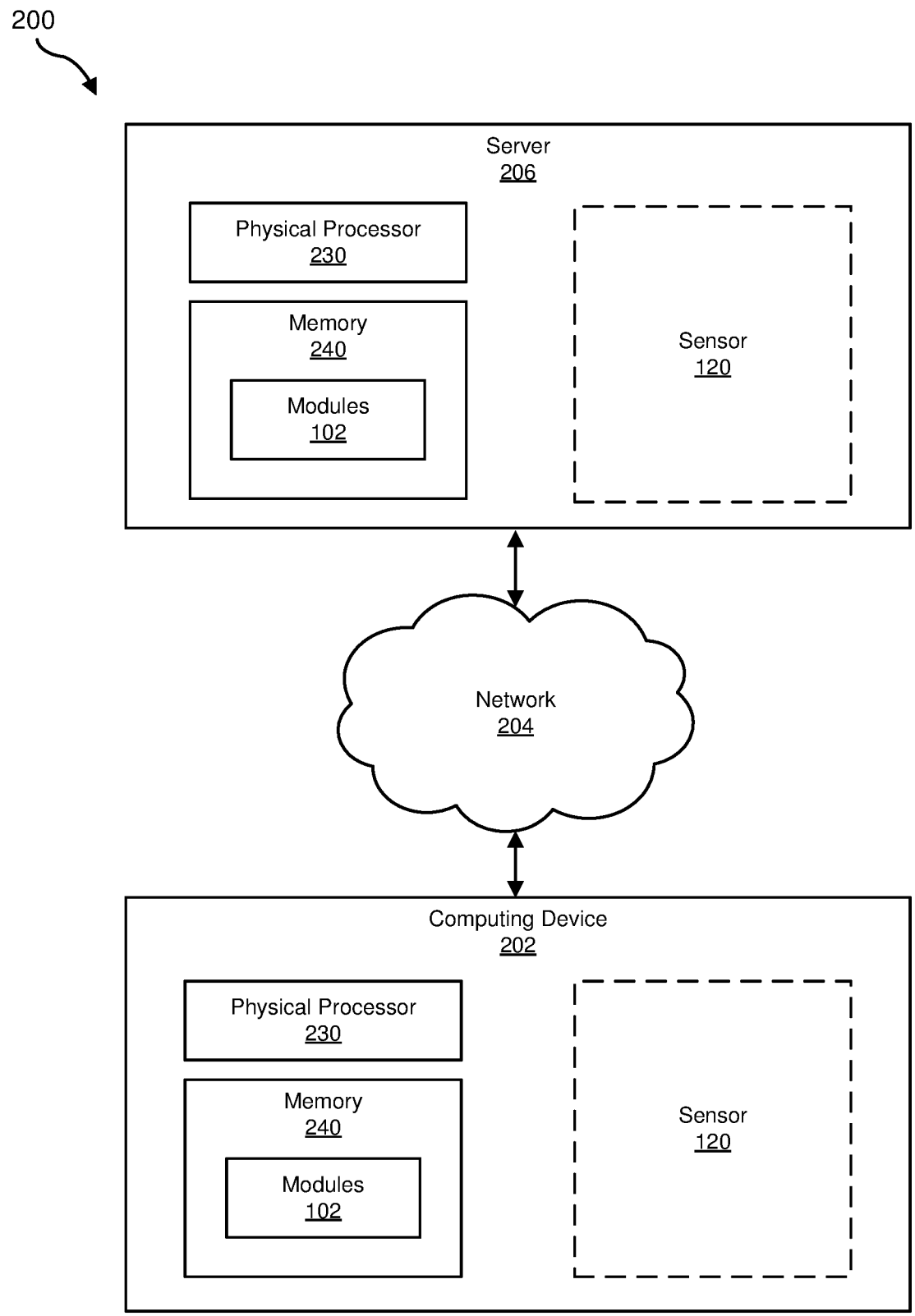
FIG. 2 is a block diagram of an exemplary network environment, according to aspects of the present disclosure.
Figure 3:
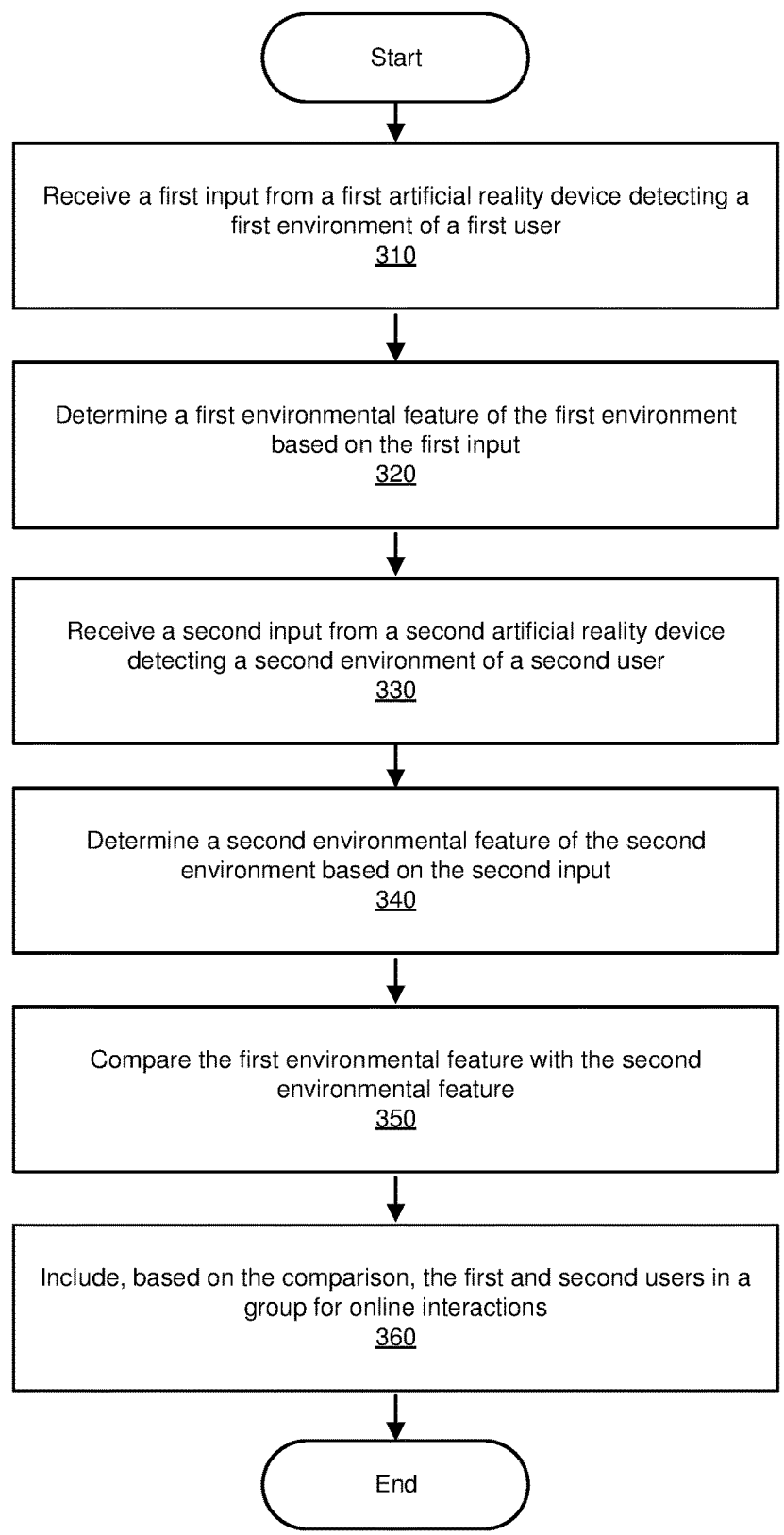
FIG. 3 is a flow diagram of an exemplary method for defining user groups using artificial reality signals, according to aspects of the present disclosure.
Figure 4A:
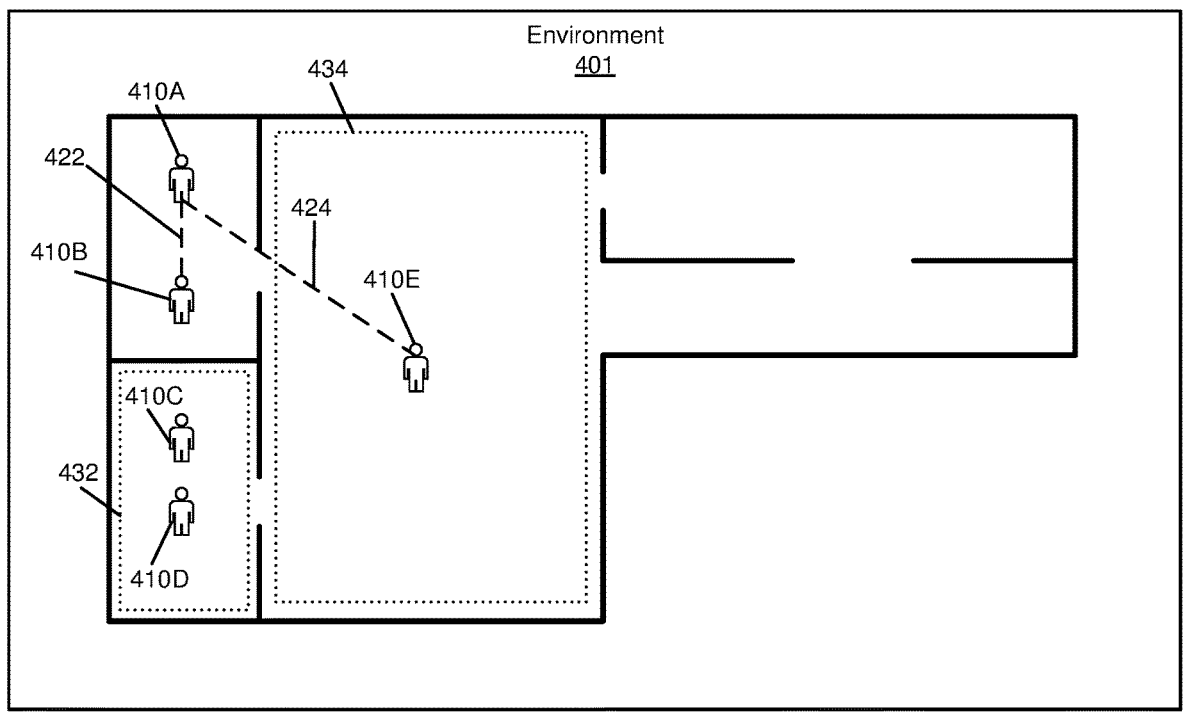
FIGS. 4A-4B are simplified diagrams of a user environment, according to aspects of the present disclosure.
Figure 4B:
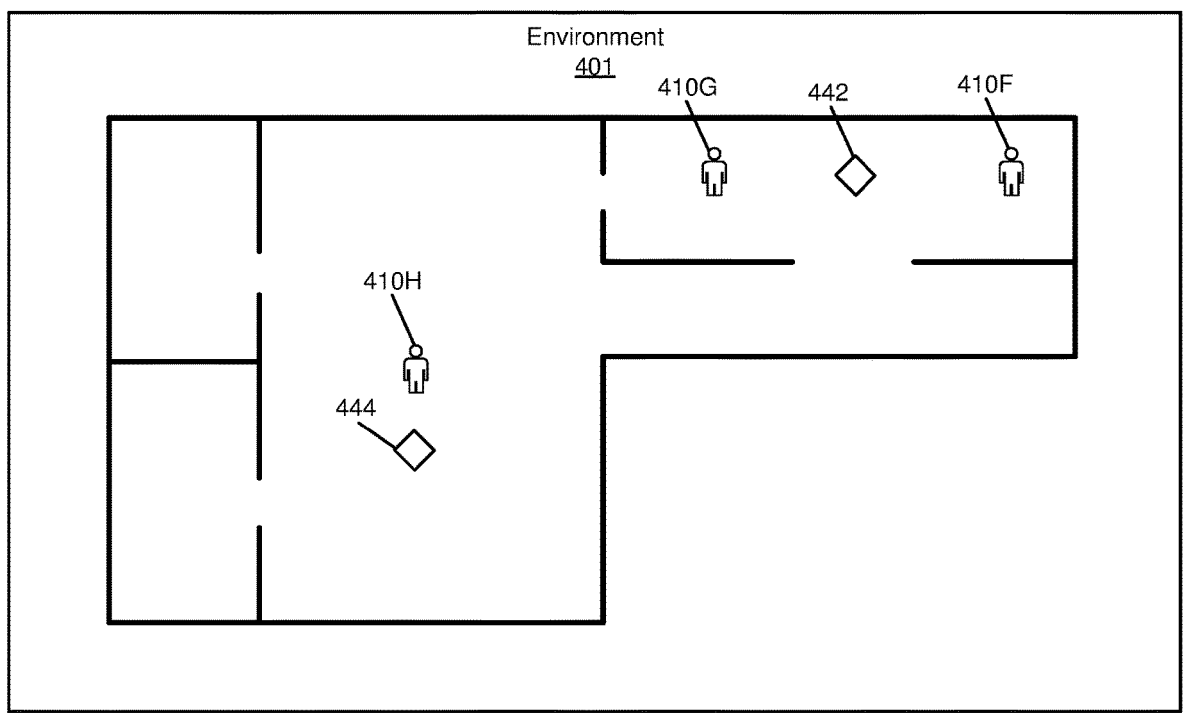
Figure 5:
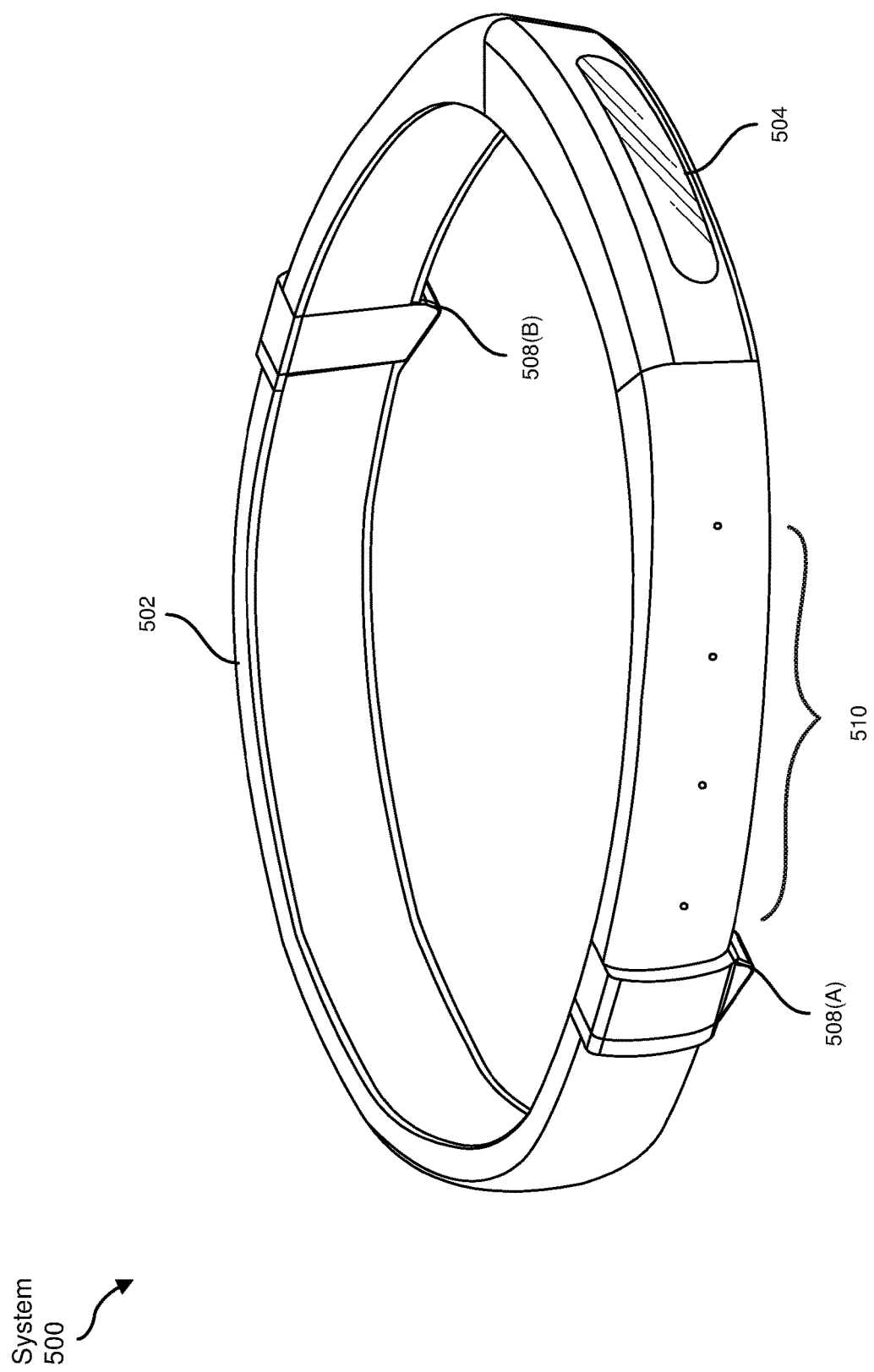
FIG. 5 is a diagram of an exemplary AR system, according to aspects of the present disclosure.
Figure 6:
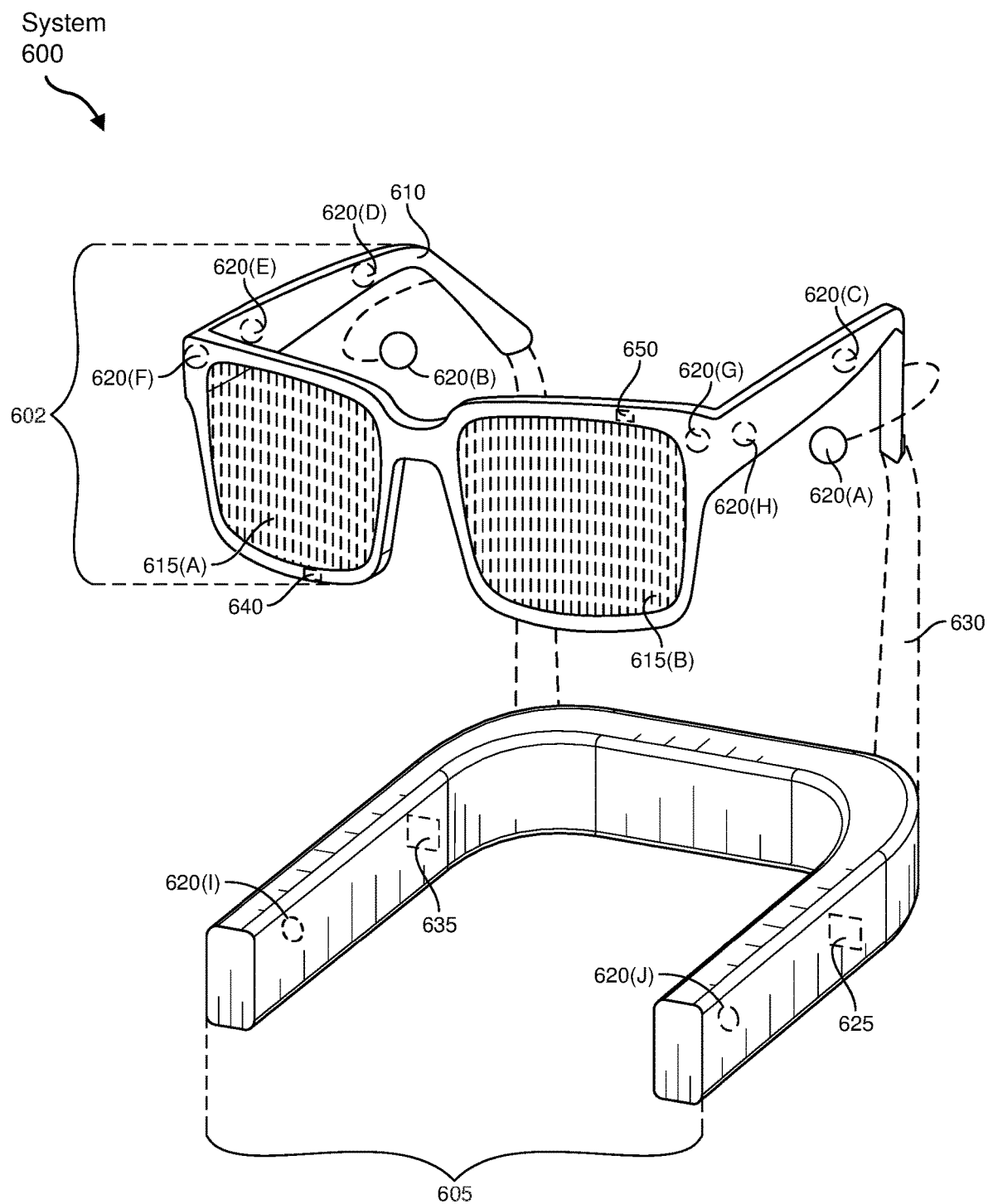
FIG. 6 is a diagram of an exemplary AR system, according to aspects of the present disclosure.
Figure 7:
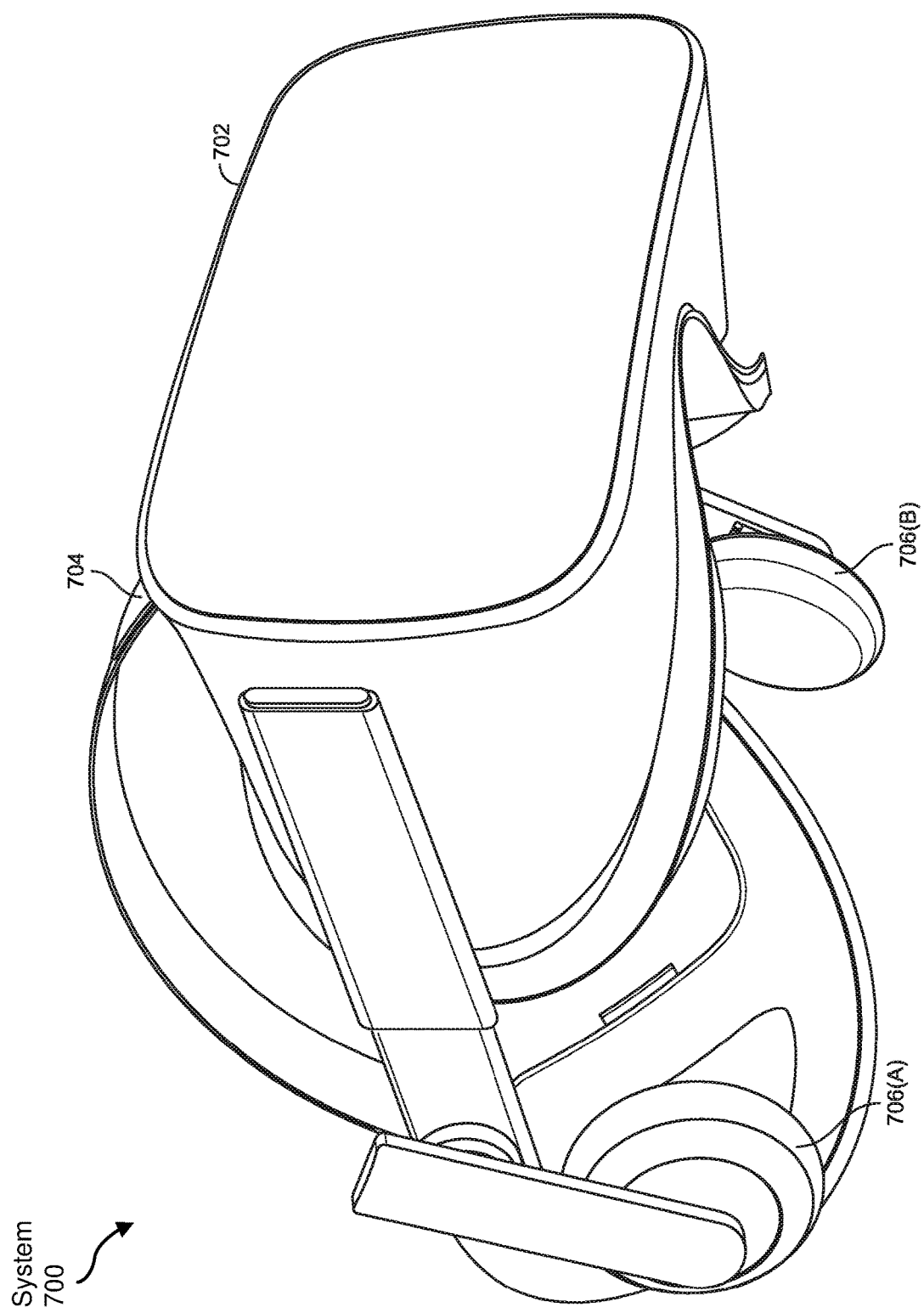
FIG. 7 is a of an exemplary VR system, according to aspects of the present disclosure.

The following will provide, with reference to FIGS. 1-7, detailed descriptions of systems and methods for defining user groups using artificial reality signals. FIG. 1 illustrates an exemplary system for defining user groups based on artificial reality. FIG. 2 illustrates an exemplary network environment. FIG. 3 illustrates an exemplary process of defining user groups using artificial reality signals. FIGS. 4A-4B illustrate various examples of how users may be grouped using artificial reality signals. FIG. 5 illustrates an exemplary AR system. FIG. 6 illustrates another exemplary AR system. FIG. 7 illustrates an exemplary VR system.

FIG. 1 is a block diagram of an example system 100 for defining user groups using artificial reality signals. As illustrated in this figure, example system 100 may include one or more modules 102 for performing one or more tasks. As will be explained in greater detail below, modules 102 may include a first receiving module 104, a first feature module 106, a second receiving module 108, a second feature module 110, a comparison module 112, and a grouping module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate defining user groups using artificial reality signals. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more sensors 120, which may be any type of sensor for capturing environmental data Environmental sensors may include optical sensors, audio sensors, antennae, etc., as will be discussed further below, for instance, with respect to FIGS. 2, 5, 6, and 7.

Example system 100 in FIG. 1 may be implemented in a variety of ways. For example, all or a portion of example system 100 may represent portions of example network environment 200 in FIG. 2, augmented reality system 500 in FIG. 5, augmented reality system 600 in FIG. 6, and/or virtual reality system 700 in FIG. 7.

FIG. 2 illustrates an exemplary network environment 200 capable of implementing various aspects of the present disclosure. As illustrated in FIG. 2, network environment 200 may include a computing device 202, a network 204, and server 206. Computing device 202 may be a client device or user device, such as an AR device (e.g., AR glasses), a desktop computer, laptop computer, tablet device, smartphone, or other computing device. Computing device 202 may include a physical processor 230, which may be one or more processors, memory 240, and sensor 120. In some implementations, computing device 202 may represent an AR device having a display that overlays images onto a user's view of his or her local environment. For example, the display may include a transparent medium that allows light from the user's environment to pass through such that the user may see the environment. The display may then draw on the transparent medium to overlay information. Alternatively, the display may project images onto the transparent medium and/or onto the user's eyes. Embodiments of the display are further described below.

Server 206 may represent or include one or more servers capable of hosting an application. For example, the application may support multiple users through network 204 and server 206. The server 206 may include a physical processor 230, which may include one or more processors, memory 240, which may store modules 102, and sensor 120.

Computing device 202 may be communicatively coupled to server 206 through network 204. Network 204 may represent any type or form of communication network, such as the Internet, and may comprise one or more physical connections, such as LAN, and/or wireless connections, such as WAN.

FIG. 3 is a flow diagram of an exemplary computer-implemented method 300 for defining user groups using artificial reality signals. The steps shown in FIG. 3 may be performed by any suitable computer-executable code and/or computing system, including the system(s) illustrated in FIGS. 1, 2, and 5-7. In one example, each of the steps shown in FIG. 3 may represent an algorithm whose structure includes and/or is represented by multiple sub-steps, examples of which will be provided in greater detail below.

As an overview of the process illustrated in FIG. 3, at step 310 one or more of the systems described herein may receive a first input from a first artificial reality device detecting a first environment of a first user. At step 320 one or more of the systems described herein may determine a first environmental feature of the first environment based on the first input. At step 330 one or more of the systems described herein may receive a second input from a second artificial reality device detecting a second environment of a second user. At step 340 one or more of the systems described herein may determine a second environmental feature of the second environment based on the second input. At step 350 one or more of the systems described herein may compare the first environmental feature with the second environmental feature. At step 360 one or more of the systems described herein may include, based on the comparison, the first and second users in a group for online interactions.

Method 300, which will be described in further detail below, may be applied to users in various locations, such as outdoor locations and/or indoor locations. Method 300 may be particularly useful for indoor locations. Users of artificial reality devices may often use the artificial reality devices in indoor locations, which may be safer than use in outdoor locations. In addition, the artificial reality devices may provide additional signals and data which may be able to compensate for other degraded signals, such as indoor GPS signals. FIGS. 4A and 4B illustrate a simplified map view of an indoor environment 401 including users 410A-410H. Environment 401 may be, for example, an indoor location such as a floor of a building containing various rooms. Users 410A-410E, in FIG. 4A, and users 410F-410H, in FIG. 4B, may be dispersed across the various rooms. Each of users 410A-410H may use their own computing device 202 to detect their respective environment. For example, the first input may comprise image data of the vicinity of user 410A in FIG. 4.

In addition to or instead of image data, the first input may include other types of data, such as other artificial reality signals. In some embodiments, the term "artificial reality signal" may refer to signals, inputs, etc. that an artificial reality system may use to sense a surrounding environment. Examples of artificial reality signals include, without limitation, image data, audio data, location signals, GPS signals, Wi-Fi signals, etc. Other examples of artificial reality signals may include user inputs using the artificial reality devices, signals and/or data derived from user interaction in the artificial reality experience, artificial reality application data, etc. Various artificial reality devices may be capable of producing artificial reality signals.

Embodiments of the instant disclosure, such as computing device 202, may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 500 in FIG. 5. Other artificial reality systems may include an NED that also provides visibility into the real world (e.g., AR system 600 in FIG. 6) or that visually immerses a user in an artificial reality (e.g., VR system 700 in FIG. 7). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 5, AR system 500 generally represents a wearable device dimensioned to fit about a body part (e.g., a head) of a user. As shown in FIG. 5, system 500 may include a frame 502 and a camera assembly 504 that is coupled to frame 502 and configured to gather information about a local environment by observing the local environment. Camera assembly 504 may correspond to camera 150. AR system 500 may also include one or more audio devices, such as output audio transducers 508(A) and 508(B) and input audio transducers 510. Output audio transducers 508(A) and 508(B) may provide audio feedback and/or content to a user, and input audio transducers 510 may capture audio in a user's environment.

As shown, AR system 500 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 500 may include other types of screens or visual feedback devices (e.g., a display screen integrated into a side of frame 502).

The embodiments discussed in this disclosure may also be implemented in AR systems that include one or more NEDs. For example, as shown in FIG. 6, AR system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While AR system 600 includes two displays, embodiments of this disclosure may be implemented in AR systems with a single NED or more than two NEDs. AR system 600 may also include or be coupled to one or more camera assemblies, such as camera 150 (not shown).

In some embodiments, AR system 600 may include one or more sensors, such as sensor 640. Sensor 640 may generate measurement signals in response to motion of AR system 600 and may be located on substantially any portion of frame 610. Sensor 640 may include a position sensor, an inertial measurement unit (IMU), a depth camera assembly, or any combination thereof. In some embodiments, AR system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

AR system 600 may also include a microphone array with a plurality of acoustic sensors 620(A)-620(J), referred to collectively as acoustic sensors 620. Acoustic sensors 620 may be transducers that detect air pressure variations induced by sound waves. Each acoustic sensor 620 may be configured to detect sound and convert the detected sound into an electronic format (e.g., an analog or digital format). The microphone array in FIG. 6 may include, for example, ten acoustic sensors: 620(A) and 620(B), which may be designed to be placed inside a corresponding ear of the user, acoustic sensors 620(C), 620(D), 620(E), 620(F), 620(G), and 620(H), which may be positioned at various locations on frame 610, and/or acoustic sensors 620(I) and 620(J), which may be positioned on a corresponding neckband 605.

The configuration of acoustic sensors 620 of the microphone array may vary. While AR system 600 is shown in FIG. 6 as having ten acoustic sensors 620, the number of acoustic sensors 620 may be greater or less than ten. In some embodiments, using higher numbers of acoustic sensors 620 may increase the amount of audio information collected and/or the sensitivity and accuracy of the audio information. In contrast, using a lower number of acoustic sensors 620 may decrease the computing power required by the controller 650 to process the collected audio information. In addition, the position of each acoustic sensor 620 of the microphone array may vary. For example, the position of an acoustic sensor 620 may include a defined position on the user, a defined coordinate on the frame 610, an orientation associated with each acoustic sensor, or some combination thereof.

Acoustic sensors 620(A) and 620(B) may be positioned on different parts of the user's ear, such as behind the pinna or within the auricle or fossa. Or, there may be additional acoustic sensors on or surrounding the ear in addition to acoustic sensors 620 inside the ear canal. Having an acoustic sensor positioned next to an ear canal of a user may enable the microphone array to collect information on how sounds arrive at the ear canal. By positioning at least two of acoustic sensors 620 on either side of a user's head (e.g., as binaural microphones), AR device 600 may simulate binaural hearing and capture a 3D stereo sound field around about a user's head. In some embodiments, the acoustic sensors 620(A) and 620(B) may be connected to the AR system 600 via a wired connection, and in other embodiments, the acoustic sensors 620(A) and 620(B) may be connected to the AR system 600 via a wireless connection (e.g., a Bluetooth connection). In still other embodiments, the acoustic sensors 620(A) and 620(B) may not be used at all in conjunction with the AR system 600.

Acoustic sensors 620 on frame 610 may be positioned along the length of the temples, across the bridge, above or below display devices 615(A) and 615(B), or some combination thereof. Acoustic sensors 620 may be oriented such that the microphone array is able to detect sounds in a wide range of directions surrounding the user wearing the AR system 600. In some embodiments, an optimization process may be performed during manufacturing of AR system 600 to determine relative positioning of each acoustic sensor 620 in the microphone array.

AR system 600 may further include or be connected to an external device. (e.g., a paired device), such as neckband 605. As shown, neckband 605 may be coupled to eyewear device 602 via one or more connectors 630. The connectors 630 may be wired or wireless connectors and may include electrical and/or non-electrical (e.g., structural) components. In some cases, the eyewear device 602 and the neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of the eyewear device 602 and neckband 605 may be located on one or more additional peripheral devices paired with eyewear device 602, neckband 605, or some combination thereof. Furthermore, neckband 605 generally represents any type or form of paired device. Thus, the following discussion of neckband 605 may also apply to various other paired devices, such as smart watches, smart phones, wrist bands, other wearable devices, hand-held controllers, tablet computers, laptop computers, etc.

Pairing external devices, such as neckband 605, with AR eyewear devices may enable the eyewear devices to achieve the form factor of a pair of glasses while still providing sufficient battery and computation power for expanded capabilities. Some or all of the battery power, computational resources, and/or additional features of AR system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 605 may be communicatively coupled with eyewear device 602 and/or to other devices. The other devices may provide certain functions (e.g., tracking, localizing, depth mapping, processing, storage, etc.) to the AR system 600. In the embodiment of FIG. 6, neckband 605 may include two acoustic sensors (e.g., 620(I) and 620(J)) that are part of the microphone array (or potentially form their own microphone subarray). Neckband 605 may also include a controller 625 and a power source 635.

Acoustic sensors 620(I) and 620(J) of neckband 605 may be configured to detect sound and convert the detected sound into an electronic format (analog or digital). In the embodiment of FIG. 6, acoustic sensors 620(I) and 620(J) may be positioned on neckband 605, thereby increasing the distance between the neckband acoustic sensors 620(I) and 620(J) and other acoustic sensors 620 positioned on eyewear device 602. In some cases, increasing the distance between acoustic sensors 620 of the microphone array may improve the accuracy of beamforming performed via the microphone array. For example, if a sound is detected by acoustic sensors 620(C) and 620(D) and the distance between acoustic sensors 620(C) and 620(D) is greater than, e.g., the distance between acoustic sensors 620(D) and 620(E), the determined source location of the detected sound may be more accurate than if the sound had been detected by acoustic sensors 620(D) and 620(E).

Controller 625 of neckband 605 may process information generated by the sensors on neckband 605 and/or AR system 600. For example, controller 625 may process information from the microphone array that describes sounds detected by the microphone array. For each detected sound, controller 625 may perform a DoA estimation to estimate a direction from which the detected sound arrived at the microphone array. As the microphone array detects sounds, controller 625 may populate an audio data set with the information. In embodiments in which AR system 600 includes an inertial measurement unit, controller 625 may compute all inertial and spatial calculations from the IMU located on eyewear device 602. Connector 630 may convey information between AR system 600 and neckband 605 and between AR system 600 and controller 625. The information may be in the form of optical data, electrical data, wireless data, or any other transmittable data form. Moving the processing of information generated by AR system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial reality systems may, instead of blending an artificial reality with actual reality, substantially replace one or more of a user's sensory perceptions of the real world with a virtual experience. One example of this type of system is a head-worn display system, such as VR system 700 in FIG. 7, that mostly or completely covers a user's field of view. VR system 700 may include a front rigid body 702 and a band 704 shaped to fit around a user's head. VR system 700 may also include output audio transducers 706(A) and 706(B). Furthermore, while not shown in FIG. 7, front rigid body 702 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 600 and/or VR system 700 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 600 and/or VR system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 500, AR system 600, and/or VR system 700 may include one or more optical sensors such as two-dimensional (2D) or three-dimensional (3D) cameras which may correspond to camera 150, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 5 and 7, output audio transducers 508(A), 508(B), 706(A), and 706(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 510 may include condenser microphones, dynamic microphones, ribbon microphones, and/or any other type or form of input transducer. In some embodiments, a single transducer may be used for both audio input and audio output.

While not shown in FIGS. 5-7, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Method 300 may be a part of a user's artificial reality experience and may be performed using any of the artificial reality devices described herein. Returning to FIG. 3, at step 310 one or more of the systems described herein may receive a first input from a first artificial reality device detecting a first environment of a first user. For example, first receiving module 104 may receive the first input from sensor 120.

The systems described herein may perform step 310 in a variety of ways. In one example, server 206 may receive the first input from sensor 120 of computing device 202. Sensor 120 may be, in some examples, an optical sensor such as a camera. Sensor 120 may have captured image data of the first user's vicinity at the first location. In other examples, sensor 120 may comprise other types of sensors, such as microphones or wireless signal receivers.

As illustrated in FIG. 3, at step 320 one or more of the systems described herein may determine a first environmental feature of the first environment based on the first input. For example, first feature module 106 may determine the first environmental feature based on the first input.

In some embodiments, the term "environmental feature" may refer to a detectable feature, characteristic, and/or attribute of a user's environment. Examples of environmental features include, without limitation, location, area, recognizable object, etc. In some examples, the environmental feature may correspond to the user's real-world environment. In other examples, the environmental feature may refer to a virtual location and/or object that the user is interacting with.

The systems described herein may perform step 320 in a variety of ways. In one example, computing device 202 and/or server 206 may determine a first location of the first user based on the first input. The artificial reality signals available from artificial reality devices may enable various ways of determining a user's location and environment which may not be feasible with conventional computing devices.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 500, 600, and 700 of FIGS. 5, 6 and 7, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sounds originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The AR or VR headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

The artificial reality devices described herein may therefore determine the first environmental feature, such as location. Turning now to FIG. 4A, the first environmental feature may correspond to a location of user 410A. As described above, the location may be determined using artificial reality signals. The location may correspond to coordinates, such as latitude and longitude, or may be coordinates with respect to a local coordinate system, such as x and y coordinates for environment 401. Alternatively, the location may correspond to an area. For instance, in FIG. 4A, users 410C and 410D may be located in area 432, and user 410E may be located in area 434. Areas 432 and 434 may correspond to rooms in environment 401, although in other examples the area may be defined in other ways. For example, the area may correspond to predefined boundaries, radius from the user, other indoor environments, etc. In some embodiments, the location may correspond to a virtual location. For instance, the user may be interacting with a virtual environment during a VR session.

In some embodiments, the environmental feature may correspond to a recognized object. For example, in FIG. 4B, users 410G and 410F may be near object 442, and user 410H may be near object 444. In some examples, the recognized object may be a virtual object.

In some embodiments, the environmental feature may include identifying the first user. For example, the user may be identified based on facial recognition. Computing device 202 may be positioned to capture image data of the user's face. The user may be identified in other ways, such as by recognizing a unique object or text associated with the user, or the user logging into a service such as a social networking service.

Returning to FIG. 3, at step 330 one or more of the systems described herein may receive a second input from a second artificial reality device detecting a second environment of a second user. For example, second receiving module 108 may receive the second input from sensor 120.

The systems described herein may perform step 330 in a variety of ways. In one example, server 206 may receive the sensor input from sensor 120 of computing device 202. Sensor 120 may be, in some examples, an optical sensor such as a camera. Sensor 120 may have captured image data of the second user's vicinity at the second location. In other examples, sensor 120 may comprise other types of sensors, such as microphones or wireless signal receivers. Similar to the first input described above, the second input may comprise one or more artificial reality signals. For example, the second input may comprise image data of the vicinity of user 410B in FIG. 4. In some embodiments, the second input may include a different type of data and/or artificial reality signal than that of the first input. In addition, the second input may be sent from a type of sensor different from that of the first input.

As illustrated in FIG. 3, at step 340 one or more of the systems described herein may determine a second environmental feature of the second environment based on the second input. For example, second feature module 110 may determine the second environmental feature based on the second input.

The systems described herein may perform step 340 in a variety of ways. In one example, computing device 202 and/or server 206 may determine a second location of the second user based on the second input. Step 340 may be performed in any suitable manner (e.g., using any algorithm, data or technique described above with respect to step 320. And, in some embodiments, the second location may be determined in a different way and/or using different types of data than were used to determine the first location.

Referring to FIG. 4A, the second environmental feature may correspond to a location of user 410B. As described above, the location may be determined using artificial reality signals. The location may correspond to coordinates, such as latitude and longitude, or may be coordinates with respect to a local coordinate system, such as x and y coordinates for environment 401. Alternatively, the location may correspond to an area. For instance, in FIG. 4A, users 410C and 410D may be located in area 432, and user 410E may be located in area 434. In some embodiments, the location may correspond to a virtual location. For instance, the user may be interacting with a virtual environment during a VR session.

In some embodiments, the environmental feature may correspond to a recognized object. An object in the vicinity of the user may be recognized using computer vision or other similar object recognition method. For example, in FIG. 4B, users 410G and 410F may be near object 442, and user 410H may be near object 444. The object may be a physical feature. In some examples, the recognized object may be a virtual object.

In some embodiments, the environmental feature may include identifying the second user. For example, the user may be identified based on facial recognition. Computing device 202 may be positioned to capture image data of the user's face. The user may be identified in other ways, such as by recognizing a unique object or text associated with the user, or the user logging into a service such as a social networking service.

Returning to FIG. 3, at step 350 one or more of the systems described herein may compare the first environmental feature with the second environmental feature. For example, comparison module 112 may compare the first environmental feature with the second environmental feature.

The systems described herein may perform step 350 in a variety of ways. In one example, the comparison may include determining a distance between the first location and the second location and comparing the distance to a distance threshold. For instance, in FIG. 4A, a distance 422 between user 410A and user 410B and/or a distance 424 between user 410A and user 410E may be compared to the distance threshold. The distance threshold may correspond to a specified distance such as 20 feet or any other suitable distance. The distance threshold may correspond to a range such as 1-20 feet or any other suitable range of distances. The distance may be calculated based on straight-line distance, as in FIG. 4A, or may be calculated based on an indirect path. In addition, the distance may be calculated based on a reference point other than a particular user. For instance, the reference point may correspond to a center point of all users already in the group. Alternatively, the distance may correspond to an average distance to other users which may be in the group or potentially added to the group.

In some examples, comparing the first environmental feature with the second environmental feature may comprise comparing the first area with the second area. For example, in FIG. 4A, area 432 associated with user 410C may be compared to area 432 associated with user 410D. Similarly, area 432 associated with user 410C may be compared to area 434 associated with user 410E.

In some examples, comparing the first environmental feature with the second environmental feature may comprise comparing the first object with the second object. For example, in FIG. 4B, object 442 associated with user 410G may be compared to object 442 associated with user 410F. Similarly, object 442 associated with user 410G may be compared to object 444 associated with user 410H.

As illustrated in FIG. 3, at step 360 one or more of the systems described herein may include, based on the comparison, the first and second users in a group for online interactions. For example, grouping module 114 may include the first and second users in the group.

The systems described herein may perform step 360 in a variety of ways. In one example, including the first and second users in the group is based on the distance satisfying the distance threshold. For instance, if the distance threshold corresponds to a maximum distance, users who are not further apart than the maximum distance may be included in the group. In FIG. 4A, distance 422 may be less than the maximum distance. Thus, users 410A and 410B may be included in the group. Distance 424 may be greater than the maximum distance. Thus, user 410E may not be included in the group with users 410A and 410B. Alternatively, the distances may correspond to average distances. For example, a distance between user 410E and user 410B may satisfy the distance threshold, but the average distance between user 410E and users 410A and 410B may not satisfy the distance threshold. If the distance threshold corresponds to a range of distances, distances falling within the range may satisfy the distance threshold such that the corresponding users may be added. In other examples, other methods of determining proximity between users may be used.

In some examples, including the first and second users in the group is based on the first area matching the second area. In FIG. 4A, users 410C and 410D may be included in a group together because both users are associated with the same area 432. User 410E may not be included in the group with users 410C and 410D as user 410E is associated with area 434.

In some examples, including the first and second users in the group is based on the first object matching the second object. If the first and second users are in close proximity to the same object, the first and second users may also be in close proximity to each other. In FIG. 4B, users 410G and 410F may both be associated with object 442 and therefore included in a group. Object 444 may differ from object 442. Thus, user 410H may not be included in the group. The objects may be virtual objects that are pegged to a particular real-world location.

In some alternative examples, the objects may be duplicated or otherwise associated with each other such that users that are not physically close may still be grouped together based on the objects. For example, object 444 may be a duplicate or otherwise associated with object 442 such that user 410H may be included in the group with users 410G and 410F.

In some examples, including the first and second users in the group is further based on the first user being associated with the second user in a social network associated with the application. For example, after identifying users, users who are friends on the social network may be grouped together. The connection on the social network may be an additional factor for determining whether to include users in a group. For instance, users who are in close physical proximity and are also friends on the social network may be automatically grouped together or suggested as a group. Other users who may be in close physical proximity but are not friends on the social network may not automatically be grouped together but may require additional confirmation to be included in the group.

According to the aspects described herein, users with artificial reality devices may be grouped together using inputs from the artificial reality devices. Users may be participating in artificial reality experiences. The artificial reality devices may provide location awareness of users and intuitively group together users that are detected in close physical proximity. One of the grouped users may then invite other group members to another experience, such as a video game. Although the grouped users may be connected on a social network, this intuitive grouping of nearby users may allow and encourage additional interaction between the grouped users. The physical proximity may allow the grouped users to interact not only within the video game, but in the real-world as well.

The aspects described herein may further allow additional grouping by leveraging the artificial reality signals. For example, proximity may be determined based on users seeing the same object, such as a particular landmark. However, the aspects described herein may further expand proximity beyond physical proximity. The common object may be duplicated and available to remote users. For example, the common object may be copies of a particular physical token which may allow users near the tokens to be included in the group, even if physically remote. Accordingly, the users may be virtually proximate and grouped based on their virtual proximity. Alternatively, the common object may be a virtual object. A virtual object may be pegged to a particular real-world location. For example, a virtual bunny may be on a desk in a room. Users in the room who view the virtual bunny using artificial reality devices may then be grouped together. In addition, copies of the virtual object, which may be pegged to remote locations, may also allow remote users near the virtual object copies to be grouped. Thus, aspects of the present disclosure may provide additional ways to group users using artificial reality signals to improve proximity awareness between users.

Moreover, the aspects described herein may enable access to a game session within a social network system. The game session can be accessed within various areas of the social network, e.g., walls, newsfeeds, timelines, etc. The game session can also be accessed using related social network applications (e.g., a messenger application). The messenger application is an application that enables users to communicate online nearly instantaneously. A player component facilitates communication between a game instance on the client device and a backend server of a social networking system. The communication information can be stored in or retrieved from a social graph of the social networking system. The game instance can be initialized from a social network application (e.g., newsfeed, messenger, etc.) of the social networking system, and the game can be played without leaving the social network application.

In various embodiments, a user can identify a game to play using a discovery component. The discovery component may list multiple games and may list the games in a specified order. As an example, the discovery component may list games for a user based on that user's prior interactions with games, "friends" indicated in the social graph, contacts in a contact list, games played by the friends and/or contacts, etc.

In various embodiments, the user may receive a "challenge" in their social network newsfeed or messenger application app. As an example, the user may receive a notification that a friend or contact has achieved a high score in a particular game. The user can accept the challenge, e.g., by "clicking" or "pressing" on the notification, to start the game. A user may receive challenges from different users for a particular game. Accepting the challenge may define a group for the particular game including the user and the friend. Alternatively, the group may facilitate issuing challenges as the group may be defined and a user of the group may issue challenges to other group members.

The aspects described herein provide methods, beyond using the user's previous interactions, for defining groups. Users of the social networking system may use artificial reality devices for accessing portions of the social networking system. The artificial reality signals from the artificial reality devices may be used for defining groups of users of the social networking system. Once the groups are defined, challenges may be issued to the group's members automatically and/or at a user's request. In some embodiments, the social networking system may recommend challenges based on the interactions of the users in the group.

In various embodiments, the score the user achieves in the game may be posted to some or all the other users. As an example, the score may be shared with a different user who sent a particular challenge, all users who sent challenges, or publicly. After the user plays a game, the user's score may be shared with other users, e.g., to challenge the other users. In various embodiments, the user can explicitly share the score, e.g., to challenge another user. In some embodiments, the score may be shared implicitly, e.g., to a "leaderboard" or as a challenge to friends or contacts. When the other user accepts the challenge, a thread of communication may be created between the user who sent the challenge and the user who accepted it.

Embodiments include integration of a gaming platform with a social networking system to enable substantially instant access to a game instance. The system architecture includes a client device that implements a client-side player component (e.g., a software component). The player component can facilitate communication between a game instance on the client device and a backend server of a social networking system. The communication can include high score, game participant identity, game participant connections, game session details, game achievements, etc. The communication information can be stored in or based on a social graph of the social networking system.

In various embodiments, each messenger app thread of communications between two or more users has a thread identifier ("thread ID"), each user of the social network has a user ID, businesses having social network pages have a page ID, and apps (e.g., game apps) have an app ID. Because a user may be simultaneously involved in playing a particular game with multiple other users, a combination of the various IDs may be used to identify a particular instance of the game, e.g., for score sharing purposes. As an example, the combination of thread ID and app ID identifies a particular game that is being played by users communicating in the thread. As another example, the combination of user ID, app ID, and page ID identifies a game hosted or sponsored by a business that the identified user is playing. Although this and the following discussion use a messaging app as a specific embodiment, one skilled in the art would recognize that the embodiments can be adapted for use with other social network conversation areas, e.g., walls, pages, newsfeeds, timelines, etc. In such cases, instead of a messaging thread ID, some other social network internal identifier can be employed (e.g., message identifier, conversation identifier, page identifier, etc.).

In various embodiments, some or all of these IDs may be anonymized. As an example, the user ID may be anonymized so that although the user's scores or score updates can be posted publicly or to other users of the social network or messenger app, the user may not be identifiable by others except perhaps the user's friends. Similarly, the thread ID may be anonymized so that the game developer cannot use the actual thread maliciously, e.g., to post advertisement messages that may be unrelated to the game. Just as thread IDs, app IDs, page IDs, and user IDs may be unique within the social network and/or messenger app, the respective anonymized IDs may also be unique.

In various embodiments, a game instance may employ the messenger app and its underlying communications protocols to exchange messages with other game instances. As examples, when a game is played by two different users in a thread, the game may exchange score information, cards of a card game, moves of a chess game, etc., between the game instances corresponding to each of the players. As a further example, when two players are in a messenger thread concurrently, one player may be able to remotely watch the other player's gameplay. An underlying "live stream" capability of the messenger platform may send a video stream of the game being played to the other user.

In various embodiments, various social signals may be sent relating to a user's game playing. As examples, a glyph or icon may be added to a user's profile photo when the user is a high scorer. As an example, a facial recognition system may identify the user's face in their profile photo and add a crown above the user's head in the photo. The modified profile photo may be limited to the messenger thread or may be available for all users of the social network or messenger app to view. Other social signals can include icons, animations, sounds, badges, etc. The social signals can correspond to scores, challenges, or other gaming concepts.

Enabling communication between the game component and the player component via the game library unlocks a myriad of social network functions, including enabling users to initiate game sessions and freely share game-related data for games previously inaccessible through a social network system. The game instance can be initialized from a social platform (e.g., newsfeed, messaging application, etc.) of the social networking system. The client-side player component can be implemented as part of a social networking website, which is accessible via a browser application running on the client device, or part of a social networking mobile application. The client-side player can access a plurality of web addresses representing third-party games (e.g., a game webpage that embeds a JavaScript library). A web server of a third-party game developer can host the game webpage. The client-side player component can load a splash screen from a game-related URL in parallel to a URL of the third-party game webpage, enabling players to experience substantially instant access to a game session. The client-side player component can further access social network information related to the game, prior to fully loading the game webpage onto the client device.

For example, two users of a social network may be physically proximate and grouped together according to various embodiments. The two users may be playing an AR game, such as an AR game having a virtual snowball fight context, together. A third member of the social network, who may be connected to one or both of the two users on the social network, may physically meet the two users by joining the same physical location. According to various embodiments, the third user may be added to the group, for instance by being detected from artificial reality signals or by one of the two users inviting the third user. The two users may receive an indication, such as a visual notification in the AR game, that the third user has joined. In addition, within the group, the users may not be restricted to the same virtual context for games. For instance, one of the users may change the AR game from the virtual snowball fight context to a wizard fireball context independently from the other users in the group. Alternatively, the users may switch to the wizard fireball context together.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive input data to be transformed, transform the input data, output a result of the transformation to identify user proximity, use the result of the transformation to define user groups, and store the result of the transformation to facilitate user interaction with the user groups. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving, from a first artificial reality device, a first artificial reality signal input detected from a first real-world environment of a first user;
determining a first environmental feature of the first environment based on the first input by recognizing, using object recognition, a first object near the first user from the first input;
receiving, from a second artificial reality device, a second artificial reality signal input detected from a second real-world environment of a second user;
determining a second environmental feature of the second environment based on the second input by recognizing, using object recognition, a second object near the second user from the second input;
comparing the first environmental feature with the second environmental feature by comparing the first object with the second object; and
including, based at least on recognizing via object recognition the first object as being a same object as the second object, the first and second users in a group for online interactions.

2. The method of claim 1, wherein:
the first environmental feature corresponds to a first location of the first user; and
the second environmental feature corresponds to a second location of the second user.

3. The method of claim 2, wherein:
the first input comprises image data of the first user's vicinity at the first location;
the second input comprises image data of the second user's vicinity at the second location;
determining the first environmental feature comprises identifying the first location based on the first input; and
determining the second environmental feature comprises identifying the second location based on the second input.

4. The method of claim 3, wherein:
comparing the first environmental feature with the second environmental feature comprises:
determining a distance between the first location and the second location; and
comparing the distance to a distance threshold; and
including the first and second users in the group is based on the distance satisfying the distance threshold.

5. The method of claim 3, wherein:
the first location corresponds to a first area;
the second location corresponds to a second area;
comparing the first environmental feature with the second environmental feature comprises comparing the first area with the second area; and
including the first and second users in the group is based on the first area matching the second area.

6. The method of claim 5, wherein the first area or the second area corresponds to an indoor environment.

7. The method of claim 1, wherein the first object or the second object corresponds to a virtual object.

8. The method of claim 1, wherein the first environmental feature or the second environmental feature corresponds to a virtual location.

9. The method of claim 1, wherein determining the first environmental feature or the second environmental feature is further based on at least one of a location signal, a GPS signal, or a WiFi signal.

10. The method of claim 1, wherein:
determining the first environmental feature includes identifying the first user;
determining the second environmental feature includes identifying the second user; and
including the first and second users in the group is further based on the first user being associated with the second user in a social network associated with an artificial reality application.

11. The method of claim 10, wherein identifying the first user or identifying the second user is based on facial recognition.

12. The method of claim 10, wherein identifying the first user is further based on recognizing, from the first input, a unique object associated with the first user.

13. A non-transitory computer-readable medium comprising computer-readable instructions that, when executed by at least one processor of a computing device, cause the computing device to:
receive, from a first artificial reality device, a first artificial reality signal input detected from a first real-world environment of a first user;
determine a first environmental feature of the first environment based on the first input by recognizing, using object recognition, a first object near the first user from the first input;
receive, from a second artificial reality device, a second artificial reality signal input detected from a second real-world environment of a second user;
determine a second environmental feature of the second environment based on the second input by recognizing, using object recognition, a second object near the second user from the second input;
compare the first environmental feature with the second environmental feature by comparing the first object with the second object; and
include, based at least on recognizing via object recognition the first object as being a same object as the second object, the first and second users in a group for online interactions.

14. The computer-readable medium of claim 13, wherein:
the first input comprises image data of the first user's vicinity at a first location of the first user;

the second input comprises image data of the second user's vicinity at a second location of the second user;
determining the first environmental feature comprises identifying the first location based on the first input; and
determining the second environmental feature comprises identifying the second location based on the second input.

15. The computer-readable medium of claim 14, wherein:
the first location corresponds to a first area;
the second location corresponds to a second area;
comparing the first environmental feature with the second environmental feature comprises comparing the first area with the second area; and
including the first and second users in the group is based on the first area matching the second area.

16. The computer-readable medium of claim 13, wherein:
determining the first environmental feature includes identifying the first user;
determining the second environmental feature includes identifying the second user; and
including the first and second users in the group is further based on the first user being associated with the second user in a social network associated with an artificial reality application.

17. The computer-readable medium of claim 13, wherein the first environmental feature or the second environmental feature corresponds to a virtual location.

18. The computer-readable medium of claim 16, wherein identifying the first user is further based on recognizing, from the first input, a unique object associated with the first user.

19. A system comprising:
one or more processors;
a memory comprising instructions that when executed by the one or more processors cause the system to:
receive, from a first artificial reality device, a first artificial reality signal input detected from a first real-world environment of a first user;
determine a first environmental feature of the first environment based on the first input by recognizing, using object recognition, a first object near the first user from the first input;
receive, from a second artificial reality device, a second artificial reality signal input detected from a second real-world environment of a second user;
determine a second environmental feature of the second environment based on the second input by recognizing, using object recognition, a second object near the second user from the second input;
compare the first environmental feature with the second environmental feature by comparing the first object with the second object; and
include, based at least on recognizing via object recognition the first object as being a same object as the second object, the first and second users in a group for online interactions.

20. The system of claim 19, wherein:
the first input comprises image data of the first user's vicinity at a first location of the first user;
the second input comprises image data of the second user's vicinity at a second location of the second user;
determining the first environmental feature comprises identifying the first location based on the first input; and
determining the second environmental feature comprises identifying the second location based on the second input.

\* \* \* \* \*